United States Patent Office 2,791,667
Patented May 7, 1957

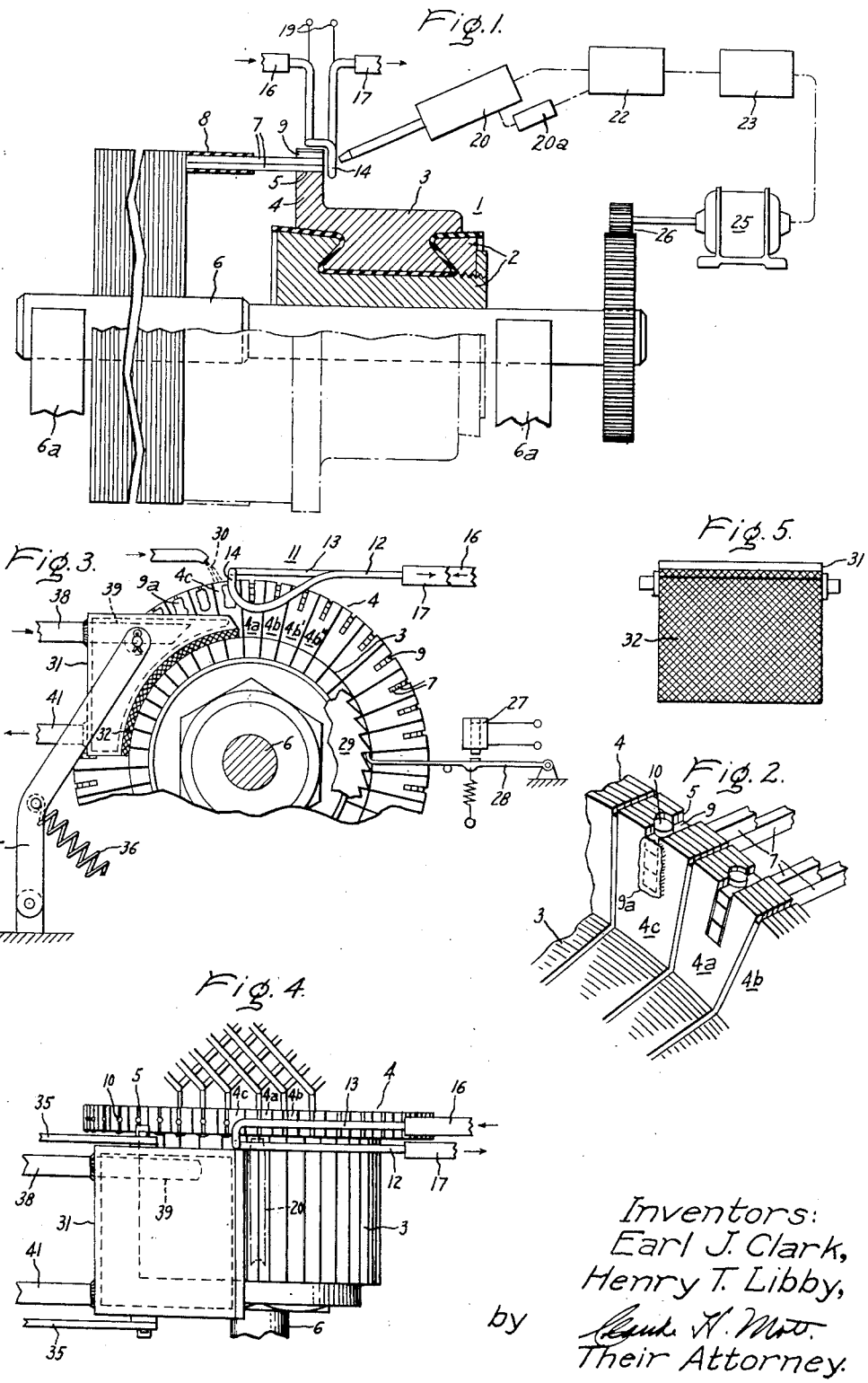

2,791,667

AUTOMATIC BRAZING APPARATUS AND METHOD

Earl J. Clark, Marblehead, and Henry T. Libby, Reading, Mass., assignors to General Electric Company, a corporation of New York Application July 8, 1955, Serial No. 520,799

17 Claims. (Cl. 219—9.5)

This invention relates to commutators and the method of connecting the same, and more particularly to a brazing apparatus and method which permits the automatically brazing of the leads in the slots of the commutator risers without annealing the commutator or damaging the insulation.

In commutator type dynamoelectric machines, each commutator bar is connected to the armature winding through two leads or two groups of parallel leads at the ears or risers of the commutator segment. In the past, attempts to form a high temperature brazed connection between the leads and a commutator riser with a brazing compound required fluxing of the riser and leads. This has required the use of iron or steel wedges to tighten the leads and the brazing material in the slot, so that induced currents may pass therethrough to heat the riser to the required brazing temperature.

Other attempts to automatically braze the risers by spinning the assembled commutator to heat the risers uniformly have resulted in inconsistent brazing of the risers because of the variation in the impedance of the various connections, resulting in some of the brazed connections being poor because the temperature required to melt the brazing material properly is never reached. By this method, other risers are heated beyond the required temperature, resulting in damage to the insulation and the annealing of the commutator segments.

Attempts to heat a large number of the risers at one time by heating a metallic ring held in contact with all of the risers has also resulted in severe damaging of the insulation and annealing the commutator and a portion of the risers which make a good contact with the ring, while risers making poor contact are not heated to the brazing temperature.

Attempts to heat ten or more risers with one induction coil, while slowly rotating the armature and preventing annealing of the commutator brush surface with a water spray, also resulted in overheating of certain of the risers while insufficient heat is supplied to other individual risers. Further, the direct application of water to cool the commutator has resulted in severe boiling and steam which obviously consumed a large percentage of the power of the induction coil.

It is therefore an object of our invention to provide an improved apparatus for brazing leads to commutator risers which overcomes these problems.

Another object of our invention is to provide an improved method of quickly brazing leads to commutator risers which includes the precise control of the temperature to which each connection is heated during the brazing operation.

Briefly, in accordance with our invention, brazing alloy metal and the ends of coil leads are placed in the riser slots of an assembled commutator. The riser is then staked to hold the ends of the leads and the brazing alloy metal tightly therein. An induction coil is then placed over several of the commutator risers to concentrate heat in a single riser to heat that riser and its associated leads to a brazing temperature while preheating the adjacent risers. A photocell is positioned to sense the temperature of the riser being heated and to cause the rotation of the commutator, so that the riser next adjacent, which has been preheated by the induced current, is placed in the heat concentration region of the induction coil after the preceding riser has been brought to brazing temperature. At the same time, the preceding riser which has been brazed is moved to a position where it is quickly cooled.

Other objects and advantages will become apparent from the following description when read in connection with the accompanying drawing, and the features of novelty will be pointed out with particularity in the claims annexed to and forming a part of this specification.

In the drawing,

Fig. 1 is a plan view of the apparatus and an assembled armature, partially in section, showing a pair of leads disposed in brazing position in accordance with our invention;

Fig. 2 is a perspective view showing one riser connection staked, ready to be brazed, and one brazed riser connection;

Fig. 3 is an end view of the commutator showing the cooling shoe and a modified positive indexing drive;

Fig. 4 is a top view of the commutator shown in Fig. 3; and

Fig. 5 shows an end view of the lining of the cooling shoe shown in Figs. 3 and 4.

Referring now to the drawing, we have shown in Fig. 1 an assembled commutator 1 which is shown as being held together by the usual V-ring clamps 2. The individual commutator segment 3 is provided with a riser portion 4 having a lead receiving slot 5 (Fig. 2). The entire armature assembly is mounted on a shaft 6 which is rotatably supported on the bearings 6a. The lead wires 7 from the rotor windings extend into a slot 5 of the commutator riser 4 to be connected thereto. In order to prevent damage of the lead wire insulation 8 (Fig. 1) which would occur at a temperature considerably below the brazing temperature, we terminate the insulation 8 at a greater distance from the risers 4 being brazed than has heretofore been customary.

In order to braze the leads 7 to the slot 5, a self-fluxing silver-copper-phosphorus brazing metal alloy 9 is placed on top of the wire leads 7 in the slot 5 of the risers 4. One such silver-copper-phosphorus metal alloy is marketed by Handy and Harman of Bridgeport, Connecticut, under the trade name of "Sil-Fos," and is composed of 80% copper, 15% silver, and 5% phosphorus. This alloy has a fusion temperature of 1185° F. and a flow temperature of 1300° F. We prefer to heat the riser, brazing alloy and the leads 7 to a temperature somewhat above the flow temperature, such as 1375° F., to compensate for normal variables that occur in manufacturing procedures. Of course, many other self-fluxing brazing alloys, such as phosphorus-copper or phosphorus-silver, may be used in our invention. With the use of brazing alloys that are externally fluxed, the removal of the corrosive flux residue must be complete to prevent corrosive deterioration of the completed machines.

Referring now to Fig. 2, we have shown two leads 7 positioned in a slot 5 with a bar of Sil-Fos brazing material 9 staked tightly in the slot by the slight deformation 10 of the riser 4a. It is preferred that the slot 5 be slightly wider than the rectangular wires 7, to provide a sufficient space, such as .004" on each side, to allow capillary action of the brazing material to surround the wires and make good electrical connections in the slots. Where wires of circular cross-section are used, this additional space may not be necessary. Fig. 2 also shows the brazed riser 4c wherein the brazing alloy metal has completely filled the space between the wire leads 7 and the slot 5 and formed a solid fused high-temperature connection 9a therebetween.

In order to provide space for the bar of brazing metal 9, we prefer that the slot be deeper than the slot of a similar machine in which lower temperature solder connections may be used. We have also found it practicable to provide a slot having .004" clearance on each side of the round or rectangular wires to insert a U-shaped ribbon of brazing material surrounding the wires in the slot. Obviously, other methods of inserting the brazing metal in the slot will occur to those skilled in the art.

With induction heating of risers, we have found that the most practicable and efficient method of brazing is to heat only one riser at a time to the brazing temperature, while preheating at least one of the adjacent risers, and cooling the one brazed riser immediately after it is brazed to prevent insulation damage or commutator annealing. In order that the induction coil 11 will concentrate the heat in the region of the one riser while preheating one or two adjacent risers prior to their being positioned in the heat concentration region, the size, configuration, and positioning of the coil are critical. We provide an elongated U-shaped induction coil 11 with the coil bifurcations 12 and 13 placed within 1/16" of the top and front, respectively, of the risers 4, the bight portion 14 bent (Fig. 1) to conform with the shape of the front corner of the riser 4a. We are able to concentrate the induced heating currents by placing the bifurcation 12 in front of the riser 4a (Fig. 3), the bifurcation 13 over the riser 4a (Fig. 4) and the bight portion 14 adjacent to one side of the riser 4a.

Thus, the riser 4a, in the heat concentration region of the coil 11, carries current induced by the bight portion 14 as well as current induced by the bifurcations 12 and 13 of the coil. The riser 4b (Fig. 3) in the preheat region carries currents induced by the bifurcations 12 and 13 alone. Because of the shape and location of the coil 11, the heat is concentrated primarily in only one riser 4a, and we have found that we are able to heat the preheated riser 4a in approximately one second to a brazing temperature in excess of 1300° F. This speed of the brazing operation makes it unnecessary to cool the leads 7 and the commutator segments 3 during the time of this brazing.

We prefer that the induction coil 11 be internally liquid-cooled by forcing water through the hollow tubing of the coil in at one end 16 and out at 17.

Power is supplied to the coil 11 by the A.-C. leads 19 from one of the well-known induction power supplies, one of which supplies current at about 500 kc. frequency, with approximately 30 kw. continuously applied for a commutator having risers 1" long and ½ x ½" square at the top. We prefer to use a high riser with the slot as shallow as practicable, and to reduce the cross-section of this riser to the smallest value compatible with design requirements to reduce the heat necessary to braze the leads and the heat conduction from the brazing area, as well as the total power consumed. Of course, the power rating and the frequency of the induction coil 11 will be varied, depending on the particular armature being brazed. For instance, with larger risers, the frequency should be lowered to create induced currents which will penetrate further into the metal of the riser, thus heating the riser more quickly.

In order to prevent excessive heating of the brazing joint when power is applied to the coil 11, when the slot in the riser 4a is raised to the brazing temperature over 1300° C., the photoelectric cell 20 senses this temperature and triggers the amplifier 22 to signal the motor control 23, which intermittently starts the driving motor 25 (Fig. 1) to rotate the commutator 1 through the reduction gearing 26. The particular amplifier used and the operation of the motor control unit 23 is not a portion of this invention and will not be further described. However, the operation of a suitable control unit is fully explained in Letters Patent 2,494,340 issued January 10, 1950, to Henry H. Leigh, and assigned to the assignee of the present application.

It is preferred that the reduction gearing 26 has a gear ratio of approximately 400:1, so that the inertia of the motor 25 will not cause the commutator 1 to rotate more than a degree after the brazed commutator riser 4a is moved from the focus area of the photocell 20.

We have found that an excellent brazed connection results when the commutator being brazed is thus intermittently rotated through the concentrated heating area of the induction coil 11. Attempts to manually control rotation are not considered feasible because of the human element of fatigue, error in visually judging the correct temperature, and slow reaction time which would result in erratic results in the brazing joint.

To accurately sense the predetermined brazing temperature, the infrared photocell 20 is focused directly on the slot of the hottest commutator segment riser 4a to detect the temperature thereof. The signal from this photocell is then applied to the amplifier 22, which signals the motor control 23. The motor control 23 determines the speed of the motor 25, which in turn determines the maximum temperature of the riser 4a. One particular heat-sensitive photocell found to be satisfactory is a lead sulfide critical resistance type, which will sense the critical temperature. The preferred photocell has a linear response of 500° F. to approximately 2500° F. This temperature range covers brazing temperatures of practically all of the suitable brazing alloys.

As most of the infrared photocells commonly used are sensitive to the surrounding temperature and humidity, we prefer to have one cell connected to sense the temperature of the slot of the riser 4a, and a second photocell 20a, shielded from the temperature signal of the riser, is used as a reference to compensate for variations in surrounding temperature and humidity. Our preferred connection of these two photocells 20 and 20a is in opposite legs of a Wheatstone bridge, balanced so that the output signal, connected to the bridge galvanometer terminals, is zero when the photocell 20 is focused on a commutator at the desired brazing temperature. With this connection, we have been able to detect a temperature between 500° F. and 2500° F. within 5 degrees. Thus, whenever the commutator riser 4a reaches the brazing temperature, the zero signal will occur to trigger the amplifier 22 and start the control unit 23. Of course, with repeated use of the control, we may prefer to use the control unit 23 to speed up the motor 25 without ever actually stopping the motor after one riser has been brazed.

With wide commutator segments, we prefer to use an intermittent drive with a positive index of the commutator. Where the segments are as wide as 5° or more, the solenoid 27 (Fig. 3) would be energized by a signal from the amplifier 22 to pick up the armature 28 to rotate the ratchet wheel 29 one notch and the commutator 1 the width of one segment. With large commutators having segments of less than 5° width, the ratchet wheel 29 could, of course, be of a greater diameter to provide the necessary positive indexing.

The cold-rolled tough pitch copper used to fabricate the commutator segments starts to anneal at approximately 400° F. Even with long narrow risers, the brazing heat could be conducted to and soften the brush surfaces. Similarly, the insulation 8 (Fig. 1) on the leads 7 will be damaged when the heat is conducted from the brazing area to the insulation. Therefore, in order to prevent damage to the insulation 8 and the insulation between the commutator segments, as well as to prevent annealing of the commutator brush surfaces, we prefer that the leads be cooled by a trickle of water 30 and the commutator segments be cooled by a hollow internally-cooled shoe 31. This cooling, to be most effective, must be done before the heat of the brazed joint is conducted to the insulation or commutator surface. We have found that satisfactory cooling may be obtained by axial alignment (Fig. 3) of the trickle of water 30 and the cooling shoe 31, to cool the conductor leads and the commutator brush surfaces immediately after the satisfactory braze has been accomplished.

In order that the cooling shoe 31 may quickly dissipate the heat in the commutator brush contact surface from the brazed riser 4c (Figs. 3 and 4), to minimize any annealing that would tend to occur in the commutator brush contact area, the cooling shoe 31 employs a flexible lining 32 to maintain intimate contact with the commutator segments, regardless of surface irregularities. It is preferred that this flexible lining 32 be of a good heat-conducting material such as copper braid, and be maintained continuously at a constant pressure on the commutator brush contact surface with spring tension applied to the supporting linkage 35 by the helical spring 36. Cooling fluid such as water is pumped from a source (not shown) into the upper pipe 38, which should be provided with an extension 39 into the tip of the cooling shoe 31 for insuring proper cooling of the tip which first contacts the brush surface. With the short brazing time of our invention, it is desirable to have the lining 32 contact several surfaces so that the latent heat being conducted from the narrow risers will not anneal the brush surfaces after the initial cooling by the tip of the shoe. Therefore, the shoe 31 is curved to contact several segments (Fig. 3). After circulating through the cooling shoe 31, the water returns to the supply through the pipe 41.

Operation

The method of operation of the apparatus of our invention is to place the assembled commutator 1 in a rotating device such as a lathe or mandrel, with the coil 11 positioned within 1/16" of one of the risers 4a as shown in Figs. 1, 3 and 4. The high frequency current is applied to the coil 11 with the bifurcations 12 and 13 and the bight 14, creating an alternating magnetic field which causes induced currents ot concentrate in the top of the riser 4a, in the brazing metal alloy 9, and in the leads 7 in the slot thereof. These induced currents quickly heat the riser 4a, the alloy and leads 7 to the brazing temperature. The bifurcations 12 and 13 also create an alternating magnetic field in the region of the risers 4b, 4b' and 4b", to induce preheating currents therein. The induced current in the risers being preheated is increased as the risers approach the bifurcations 12 and 13 (Fig. 3) to create an increasing temperature as the risers move through the preheat zone. The rate of increase accelerates rapidly as the riser nears the bight 14 of the coil 11.

The photocell 20 senses the brazing temperature and triggers the amplifier 22, causing the armature to be rotated intermittently counterclockwise, as shown in Fig. 3. The leads 7, and the commutator segment 3, which are connected to the riser 4c (Fig. 3) are immediately cooled by the water trickle 30 and the lining 32 of the cooling shoe 31 respectively. At the same time, the preheated riser 4b is moved to the region of riser 4a, where the magnetic field produced by the current in the bight portion 14 and the bifurcations 12 and 13 will quickly raise its temperature from the preheat temperature to the brazing temperature of approximately 1375° F.

While we have illustrated and described our invention in a preferred application with respect to the joining of conductor leads to commutator risers, modifications thereof will occur to those skilled in the art. We desire it to be understood, therefore, that our invention is not limited to the particular arrangement disclosed, and we intend by the appended claims to cover all such modifications as do not depart from the true spirit and scope of our invention.

What we claim as new and desire to secure by Letters Patent is:

1. An apparatus for brazing armature winding leads to risers of commutator segments after the leads have been placed in slots of the risers together with a brazing alloy metal, comprising a U-shaped induction coil having a bent bight portion, said coil being adapted to be placed adjacent to one of the risers to induce currents therein sufficient to heat said one riser to a temperature which will melt said metal, means for sensing said temperature, means connected to said sensing means for rotating said armature assembly to move said one riser from under said coil and to move a riser next adjacent to said one riser under said coil, and means positioned adjacent to said coil for cooling said one riser when said armature is rotated.

2. An apparatus for brazing armature winding leads to risers of assembled commutator segments after the leads have been placed in slots of the risers together with a brazing alloy metal, comprising a U-shaped induction coil having a bent bight portion, said coil being adapted to be placed adjacent to one of the risers to induce currents therein sufficient to heat said one riser to a brazing temperature, means for sensing said temperature, means connected to said sensing means for rotating said armature assembly counterclockwise to move said one riser from under said coil and to move a riser next adjacent to said one riser into the hottest region of said coil, and means positioned counterclockwise of the coil for cooling said one riser when said armature is rotated.

3. An apparatus for brazing armature winding leads to risers of assembled commutator segments after the armature has been assembled and the leads have been placed in slots of the risers together with a brazing alloy metal, comprising high frequency power supply, a U-shaped induction coil connected to be energized from said power supply and having a bent bight portion with bifurcations extending therefrom, said coil adapted to be placed adjacent to one of the risers with the bend of said bight portion positioned adjacent to the leading corner of said one riser and one of said bifurcations over said one riser and one of said bifurcations in front of said one riser, thereby to induce currents in said one riser sufficient to heat said one riser to a brazing temperature to melt said metal, means for sensing said temperature, an internally cooled shoe mounted to cool the segment adjacent to the segment adjacent to said one riser to prevent annealing of the brush surface thereof, and means connected to said sensing means for rotating said armature assembly to move said one riser from the region of said coil to the region of said shoe and to move the riser next adjacent to be heated to said brazing temperature by said coil, whereby the segment of said one riser may be cooled and said next riser may be brazed.

4. An apparatus for brazing armature winding leads to risers of assembled commutator segments after the leads have been placed in slots of the risers together with a brazing alloy metal, comprising high frequency power supply, a U-shaped induction coil connected to be energized from said power supply and having a bent bight portion with bifurcations extending therefrom, said coil adapted to be placed adjacent to one of the risers with the bend of said bight portion positioned adjacent to the leading corner of said one riser and one of said bifurcations over said one riser and one of said bifurcations in front of said one riser, thereby to induce currents in said one riser sufficient to heat said one riser to a predetermined brazing temperature to melt said metal, said coil being hollow to allow passage of a cooling liquid therethrough, an infrared photocell focused on the slot of said one riser, an internally cooled shoe positioned to cool the brush surface of the segment adjacent to the segment of said one riser, and means connected to said photocell to be triggered by a signal therefrom to rotate said armature assembly to move said one riser from the heating region of said coil to the region of said shoe, and to move the riser next adjacent into the heating region to be heated to said brazing temperature by said coil, whereby the segment of said one riser may be cooled and said next riser may be heated to said brazing temperature.

5. An apparatus for brazing armature winding leads to risers of assembled commutator segments after the leads have been placed in slots of the risers together with a brazing alloy metal, comprising high frequency power supply, a U-shaped induction coil connected to be energized from said power supply and having a bent bight portion with bifurcations extending therefrom, said coil adapted to be placed adjacent to one of the risers with the bend of said bight portion positioned adjacent to the leading corner of said one riser and one of said bifurcations over said one riser and one of said bifurcations in front of said one riser thereby to induce currents in said one riser sufficient to heat said one riser to a predetermined brazing temperature to melt said metal, said coil being hollow to allow passage of a cooling liquid therethrough, an infrared photocell focused on the slot of said one riser, an internally-cooled shoe prositioned to cool the brush surface of the segment adjacent to the segment of said one riser, means positioned adjacent to the back of the brazed risers for cooling the leads of brazed risers, and means connected to said photocell to be triggered by a signal therefrom to rotate said armature assembly to move said one riser from the heat concentration region of said coil to the region of said shoe, and said means to move the riser next adjacent into the heating region to be heated to said brazing temperature by said coil, whereby the segment and the leads of said one riser may be cooled and said next riser may be heated to said brazing temperature.

6. An apparatus for brazing armature winding leads to risers of assembled commutator segments after the leads have been placed in slots of the risers together with a self-fluxing brazing alloy metal, comprising a U-shaped induction coil adapted to be placed adjacent to one of the risers and to be energized from a high frequency source to induce currents in said one riser sufficient to heat said one riser to a predetermined brazing temperature, means for sensing said temperature, a water-cooled shoe mounted adjacent to said one riser, a flexible lining secured to said shoe and adapted to contact the brush surfaces of several segments adjacent to and one side of the segment of said one riser, means connected to said sensing means for rotating said assembled commutator segments to move said one riser from the heating region of said coil to a position where said flexible lining contacts said brush surface of the segment of said one riser and to move the riser next adjacent under said coil, whereby the segment of said one riser is cooled quickly and another riser is positioned to be heated by said coil to said brazing temperature.

7. An apparatus for brazing armature winding leads to risers of assembled commutator segments after the leads have been placed in slots of the risers together with a self-fluxing brazing alloy metal, comprising a U-shaped induction coil having a bent bight portion adapted to be placed adjacent to one of the risers, said coil arranged to be energized from a high frequency source to induce currents in said one riser sufficient to heat said one riser to a predetermined brazing temperature, means for sensing said temperature, an internally-cooled shoe mounted adjacent to said one segment, a flexible lining secured to said shoe and adapted to contact segments adjacent to but one side of the segment of said one riser, a trickle of cooling fluid adapted to cool the leads adjacent to but on said one side of said one riser, means connected to said sensing means for rotating said assembled commutator to move said one riser from the heating region of said coil to a position where said lining contacts the brush surface of the segment of said one riser and said trickle of water contacts the leads thereof, whereby the brush surface of the segment of said one riser and the leads of said one riser are cooled quickly and another riser is positioned to be heated by said coil to said brazing temperature.

8. An apparatus for brazing armature winding leads to risers of assembled commutator segments after the leads have been placed in slots of the risers together with a brazing alloy metal, comprising a U-shaped induction coil and having a bent bight portion adapted to be placed adjacent to one of the risers and bifurcations adapted to be placed above and in front of a plurality of risers including said one riser, said coil arranged to be energized from a high frequency source to concentrate induced currents in said one riser sufficient to heat said one riser to a predetermined brazing temperature and to induce preheating currents in the risers adjacent to said one riser, a water-cooled shoe mounted adjacent to said one riser and to contact segments adjacent to but one side of the segment of said one riser, means for sensing said brazing temperature and deriving a signal, a ratchet drive means connected to be energized by said signal for rotating said assembled commutator segments to move said one riser from the heat concentration region of said coil to the position where said shoe contacts the brush surface of the segment of said one riser and to move said adjacent riser into said heat concentration region of said coil, whereby the segment of said one riser is cooled quickly by said shoe, and said adjacent riser is heated quickly by said coil to said brazing temperature.

9. A method of brazing armature winding leads to risers extending radially from assembled commutator segments to provide high temperature joints therebetween, comprising the steps of staking the leads and brazing metal in slots of said risers, placing a U-shaped induction coil adjacent to a plurality of the risers with the bight portion of said coil adjacent to one riser, energizing said coil to induce high frequency currents in a plurality of adjacent risers while concentrating the induced currents in said one riser to heat it quickly to a temperature slightly above the flow temperature of said metal, sensing the said temperature of said one riser, and removing said one riser from the region of heat concentration to prevent heating it above the desired temperature.

10. A method of brazing armature winding leads to risers extending radially from assembled commutator segments to provide high temperature joints therebetween, comprising the steps of staking the leads and brazing alloy metal in slots of said risers, placing a U-shaped induction coil adjacent to a plurality of the risers with the bight portion of said coil adjacent to one riser, energizing said coil to induce high frequency currents in a plurality of adjacent risers while concentrating the induced currents in said one riser to heat it quickly to a temperature slightly above the flow temperature of said metal, sensing the said temperature of said one riser, removing said one riser from the region of heat concentration to prevent heating it above the desired temperature, and placing the next adjacent riser of said plurality of risers in said region to quickly raise its temperature to said desired temperature.

11. A method of brazing armature winding leads to risers extending radially from assembled commutator segments to provide high temperature joints therebetween, comprising the steps of providing a commutator assembly having risers each provided with a slot therein at the periphery thereof in which the leads together with a brazing alloy metal have been placed, placing a U-shaped induction coil adjacent to said assembled commutator with the bight portion of said coil adjacent to one riser, energizing said coil to induce high frequency currents in a plurality of adjacent risers while concentrating the induced currents in said one riser to heat it to a predetermined brazing temperature slightly above the flow temperature of said metal, deriving an electric signal at said predetermined temperature of said one riser, rotating said assembled commutator intermittently in response to said signal to move the preheated riser next adjacent to said one riser into the heat concentration region of said bight portion of said coil, and to move said one riser from the heating region of said coil, and quickly cooling the brush surface of the segment of said one riser to prevent annealing thereof.

12. A method of brazing armature winding leads to risers extending radially from assembled commutator segments to provide high temperature joints therebetween, comprising the steps of rotatably mounting a commutator assembly having risers each provided with a slot therein at the periphery thereof in which the leads together with a brazing alloy metal have been placed, placing a U-shaped induction coil adjacent to said assembled commutator with the bight portion of said coil adjacent to one riser, energizing said coil to induce high frequency currents in a plurality of adjacent risers while concentrating the induced currents in said one riser to heat it to a predetermined brazing temperature slightly above the flow temperature of said metal, deriving an electric signal at said predetermined temperature of said one riser, rotating said assembled commutator intermittently in response to said signal to move the preheated riser next adjacent to said one riser into the heat concentration region of said bight portion of said coil and to move said one riser from the heating region of said coil, quickly cooling the brush surface of the segment of said one riser to prevent annealing thereof, and quickly cooling the leads brazed to said one riser to prevent insulation damage thereon.

13. An induction heating means for brazing winding leads in slots of risers of assembled commutator segments comprising an elongated U-shaped induction heating coil for producing a pulsating magnetic field; said coil having bifurcations joined by a curved bight portion and being adapted to have one of said bifurcations positioned over one of the risers to be brazed, to have the other of said bifurcations positioned in front of said one riser and to have the bight portion positioned adjacent to said one riser for concentrating induced currents therein; means for energizing said coil to produce induced heating currents in said one riser; means for sensing the brazing temperature in said one riser; means connected to said sensing means for rotating the armature to move said one riser being brazed from the heat concentration region of said coil and means positioned adajcent to said coil for cooling the segment connected to said one riser and the leads brazed thereto to contact and cool said segment and said leads as the commutator is rotated.

14. An induction heating means for brazing armature winding leads in a slot of a riser of a commutator segment comprising a U-shaped elongated induction heating coil connected for producing a pulsating magnetic field, said coil having bifurcations joined by a curved bight portion and being adapted to have one of said bifurcations positioned over said riser to be brazed, the other of said bifurcations positioned in front of said riser and said bight portion positioned adjacent to said riser, thereby to induce currents therein, an infrared photocell focused on the slot of said riser for sensing a predetermined temperature of the slot in said riser being brazed, and a motor connected to be started by a signal from said photocell for rotating the armature to move said riser from the region of said coil when a predetermined brazing temperature is sensed by said photocell.

15. An induction heating means for brazing winding leads to commutator risers comprising an elongated U-shaped induction heating coil for producing a pulsating magnetic field, said coil having bifurcations joined by a curved bight portion and being adapted to have one of said bifurcations positioned over a riser to be brazed and to have the other of said bifurcations positioned in front of said riser, means for sensing the temperature of said riser being brazed, means connected to said sensing means for rotating the armature to move said riser from the heating region of said coil, and means for cooling the segment of said riser and the leads brazed thereto placed to engage said leads and segment as said riser leaves the heating region.

16. An induction heating means for brazing winding leads in slots of risers of commutator segments comprising an elongated U-shaped induction heating coil for producing a pulsating magnetic field in a plurality of risers, said coil having bifurcations joined by a curved bight portion, said bight portion being positioned adjacent to one riser to concentrate the heat therein, a first photoelectric cell focused on the slot of said one riser for sensing the predetermined brazing temperature in said one riser, a second photoelectric cell connected in circuit with said first photoelectric cell for compensating for surrounding temperature and humidity to prevent changes thereof from effecting the temperature reading, means connected to said photoelectric cell circuit for rotating the segments to move said one riser from the heat concentration region of said coil to limit the temperature of said one riser.

17. An apparatus for brazing armature winding leads to risers of commutator segments after the leads have been placed in slots of the risers together with a brazing alloy metal, comprising a U-shaped induction coil having a bent bight portion, said coil being adapted to be placed adjacent to one of the risers to induce currents therein sufficient to heat said one riser to a temperature which will melt said metal, means for sensing said temperature, and means connected to said sensing means for rotating said armature assembly to move said one riser from under said coil and to move a riser next adjacent to said one riser under said coil.

References Cited in the file of this patent

UNITED STATES PATENTS

| | | |
|---|---|---|
| 1,164,278 | Geisenhouer et al. | Dec. 14, 1915 |
| 2,455,560 | Cobb et al. | Dec. 7, 1948 |
| 2,484,333 | Cobb et al. | Oct. 11, 1949 |
| 2,660,682 | Clokey et al. | Nov. 24, 1953 |